United States Patent
Keip et al.

[11] Patent Number: 6,152,663
[45] Date of Patent: Nov. 28, 2000

[54] SHIPPING SYSTEM FOR STABILIZING FLEXIBLE LOADS

[76] Inventors: Charles P. Keip, 1052 Byron Rd., Byron Center, Mich. 49315; Scott A. Seth, 2226 Melvin SW., Wyoming, Mich. 49509

[21] Appl. No.: 09/307,870

[22] Filed: May 10, 1999

Related U.S. Application Data

[63] Continuation-in-part of application No. 08/998,195, Dec. 24, 1997, Pat. No. 6,050,761.

[51] Int. Cl.[7] ................................................. B60P 7/12
[52] U.S. Cl. .......................... 410/35; 410/34; 410/41; 410/97; 410/99; 410/154
[58] Field of Search .................. 410/34, 40, 32, 410/35, 36, 41, 97, 99, 154, 155; 220/1.5, 4.01, 9.1; 206/597, 443, 453, 586; 53/139.7

[56] References Cited

U.S. PATENT DOCUMENTS

| | | |
|---|---|---|
| 1,793,059 | 2/1931 | Chambers .................................. 410/36 |
| 1,876,758 | 9/1932 | Romine . |
| 2,283,930 | 5/1942 | Hedges . |
| 2,284,616 | 5/1942 | Hedges .................................. 410/40 X |
| 3,220,583 | 11/1965 | Robertson . |
| 3,616,899 | 11/1971 | Blackman .............................. 206/597 |
| 4,247,237 | 1/1981 | Brown .................................... 410/154 |
| 4,314,783 | 2/1982 | Parnell et al. ........................... 410/34 |
| 4,444,311 | 4/1984 | Rias .................................... 206/443 X |
| 5,307,928 | 5/1994 | Bishop .............................. 206/586 X |
| 5,848,865 | 12/1998 | Beals ........................................ 410/99 |
| 5,860,827 | 1/1999 | Edwards ............................. 206/443 X |
| 5,899,046 | 5/1999 | Hughes .............................. 206/586 X |
| 6,050,761 | 4/2000 | Keip et al. .............................. 410/35 |

FOREIGN PATENT DOCUMENTS 132587  2/1985  European Pat. Off. ............... 206/443

*Primary Examiner*—Stephen T. Gordon
*Attorney, Agent, or Firm*—Harpman & Harpman

[57] ABSTRACT

A shipping assembly for securing and stabilizing a load for truck transportation using recyclable components. The shipping assembly includes multiple support structures positioned about the load with oppositely disposed end cap assemblies to stabilize and protect the load which is comprised of multiple elongated semi-rigid containers.

14 Claims, 7 Drawing Sheets

SHIPPING SYSTEM FOR STABILIZING FLEXIBLE LOADS

This is a CIP patent application of Ser. No. 08/998,195, filed Dec. 24, 1997 and issued on Apr. 18, 2000 as U.S. Pat. No. 6,050,761.

BACKGROUND OF THE INVENTION

1. Technical Field

This shipping assembly relates to shipping of multiple units of elongated packaged material that have little torsional rigidity and is therefore difficult to secure on a flat bed truck or the like without using heavy structural encasement systems of wood and metal banding.

2. Description of Prior Art

Prior art shipping systems have relied on a variety of crating material such as wood to form rigid bundles of the load. Such systems generate large quantities of waste material that requires costly processing and disposal of including metal components such as strapping, lumber and associated hardware such as nails and the like. Other shipping container systems have been developed for special products, see for example U.S. Pat. Nos. 4,314,783, 2,284,616, 2,283,930 and 1,876,758.

In U.S. Pat. No. 4,314,783 a quick release load securing device can be seen in which high tension banding is used to secure a load on a railroad car. A release device holds the banding in tension about the load. The release element on the device can be quickly released by engagement with a hammer.

U.S. Pat. No. 2,284,161 is directed to a means and method of assembling metallic articles for shipment. The method employs metal banding that is wrapped about and between the bundles of rod-like materials forming multiple groups that are held in place more easily on the truck.

U.S. Pat. No. 2,283,930 discloses a shipping and assembly system for metallic articles that use multiple spacers between stacked sheets that are then banded together by interweaving bands that extend around each stack and interconnect same together.

U.S. Pat. No. 1,876,758 is directed to a shipping method and apparatus that forms stacks of packs separated by wood strips and sheets that are then bound together by upright bracing elements and wires.

SUMMARY OF THE INVENTION

A shipping system for securing multiple elongated packages of synthetic siding material into transportable bundles adapted to over the road shipping by truck. The shipping system utilizes interconnecting retaining brackets positioned about groups of packages. The brackets are formed from recyclable process cellulose material in pre-formed structural shapes.

DESCRIPTION OF THE PREFERRED EMBODIMENT

Figure 1:
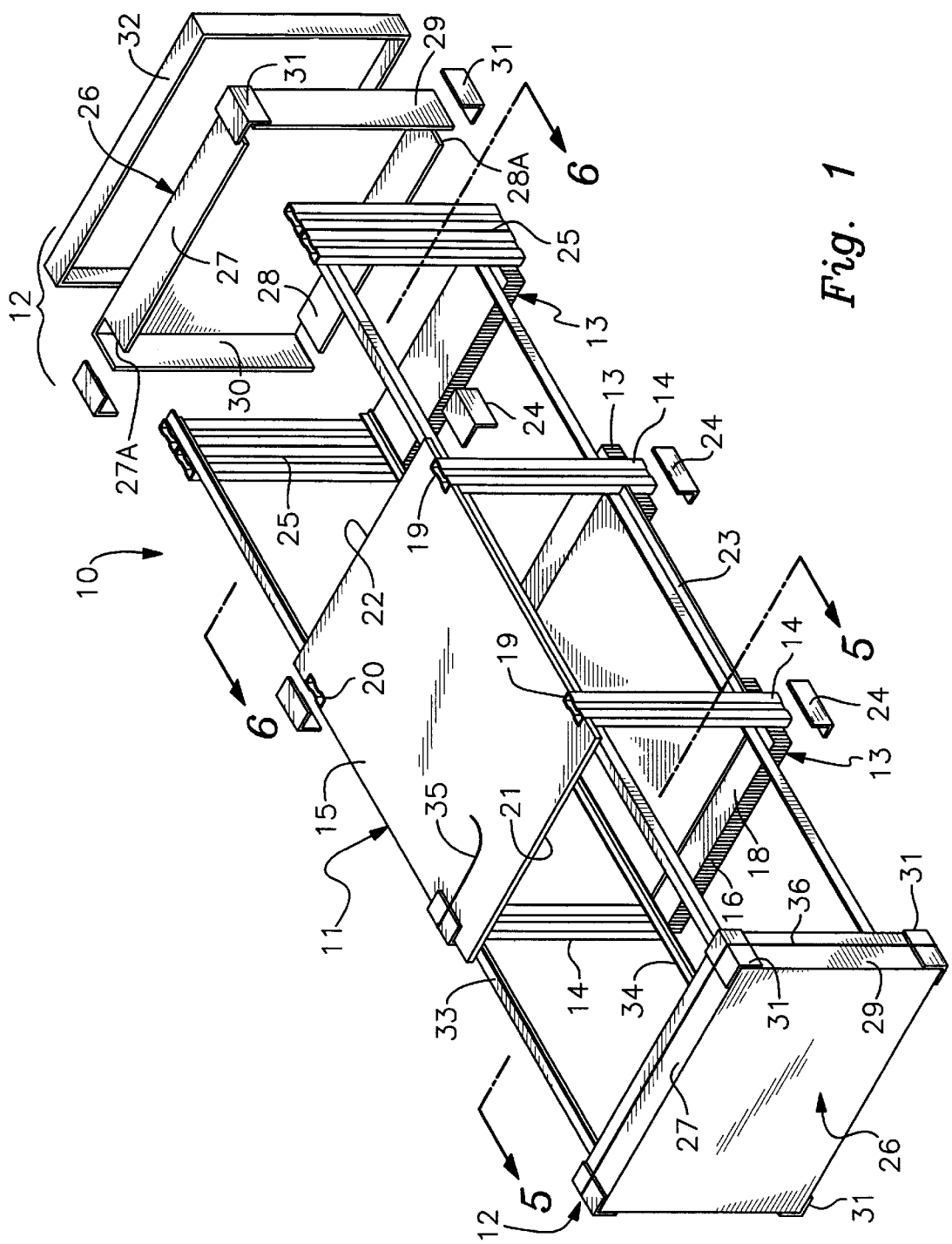
FIG. 1 is an expanded isometric view of the shipping assembly of the invention.
Figure 2:
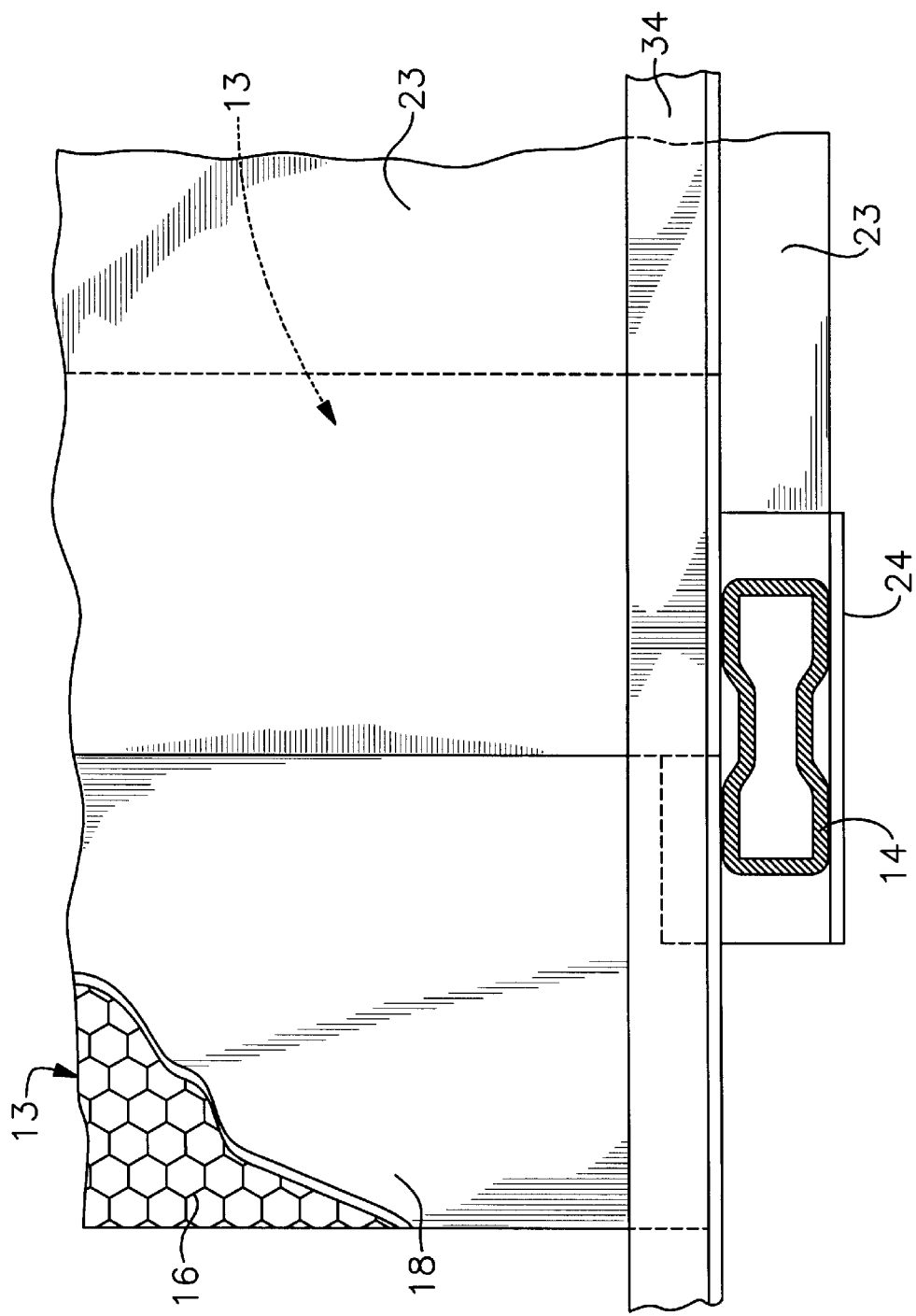
FIG. 2 is an enlarged cross-sectional view FIG. 1.
Figure 6:
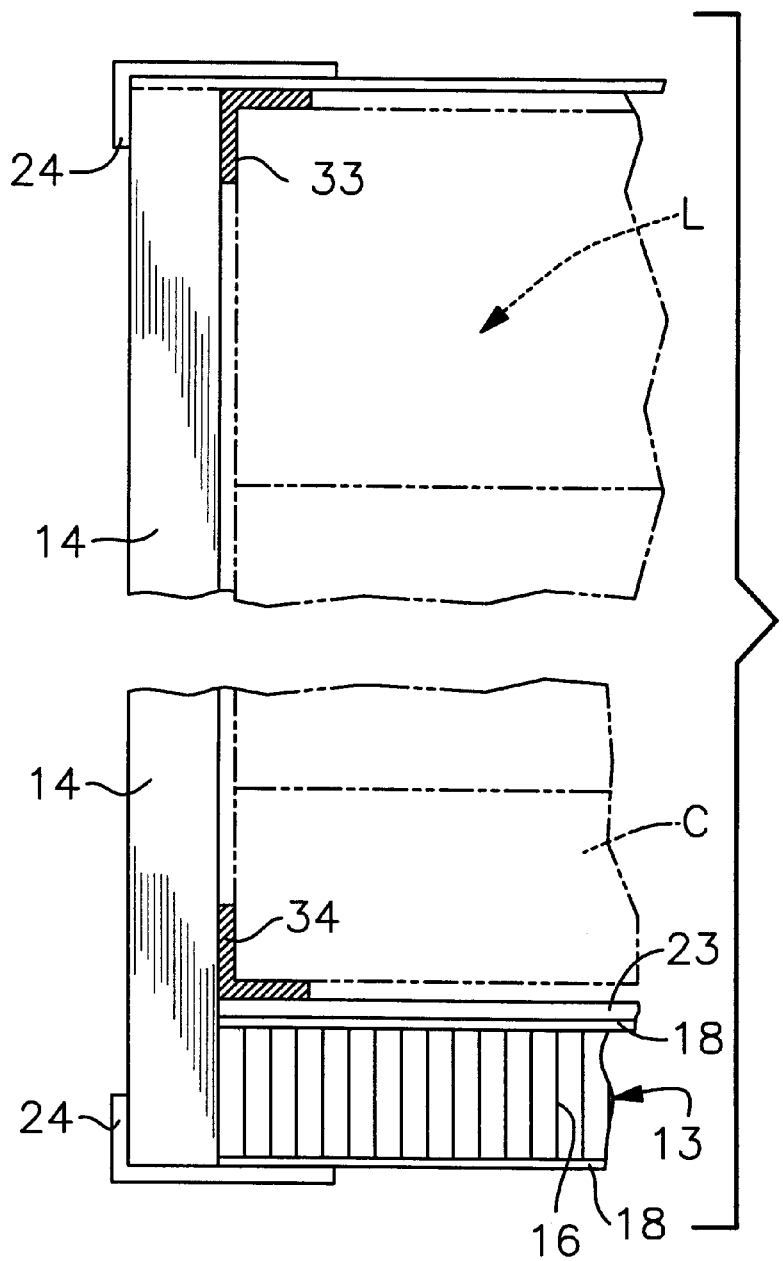
FIG. 6 is an enlarged partial cross-sectional view on lines 6—6 of FIG. 1 with portions broken away.

Referring to FIG. 1 of the drawings, a shipping assembly 10 of the invention can be seen having an intermediate support assembly 11 and oppositely disposed end cap assemblies 12. The intermediate support assembly 11 has a pair of cellulose base pads 13 and multiple pairs of upstanding support tubes 14 with an overlying interconnecting element 15. The base pads 13 have a honeycomb center of interconnected cellulose bands 16 on edge between upper and lower encasement paper skins 18 as will be well understood by those skilled in the art. As such, the base pads 13 provide a raised insulated surface for a load L illustrated in FIG. 6 of the drawings. The upstanding support tubes 14 are of a "Sonoco"* post type in which layers of cellulose paper are wrapped around a mandrel, not shown, and glued and then removed providing a free standing rigid tubular assembly as illustrated in FIG. 2 of the drawings.

*Registered Trademark of Sonoco Products Company

The overlying interconnecting element 15 is made from multiple layers of cardboard sheets of longitudinally fluted construction having pairs of oppositely disposed notches 19 and 20 registerable with the upstanding support tubes 14 inwardly from its respective ends 21 and 22. A baseboard 23 (typically of a hard board fabrication) extends between the respective honeycomb base pads 13 overlying adjacent portions thereof.

Referring now to FIGS. 1–3 and 6 of the drawings, a plurality of corner flaps 24 can be seen positioned over the free ends of the support tubes 14 and the notches in the interconnecting element 15 as well as the honeycomb base pads 13 respectively.

Figure 5:
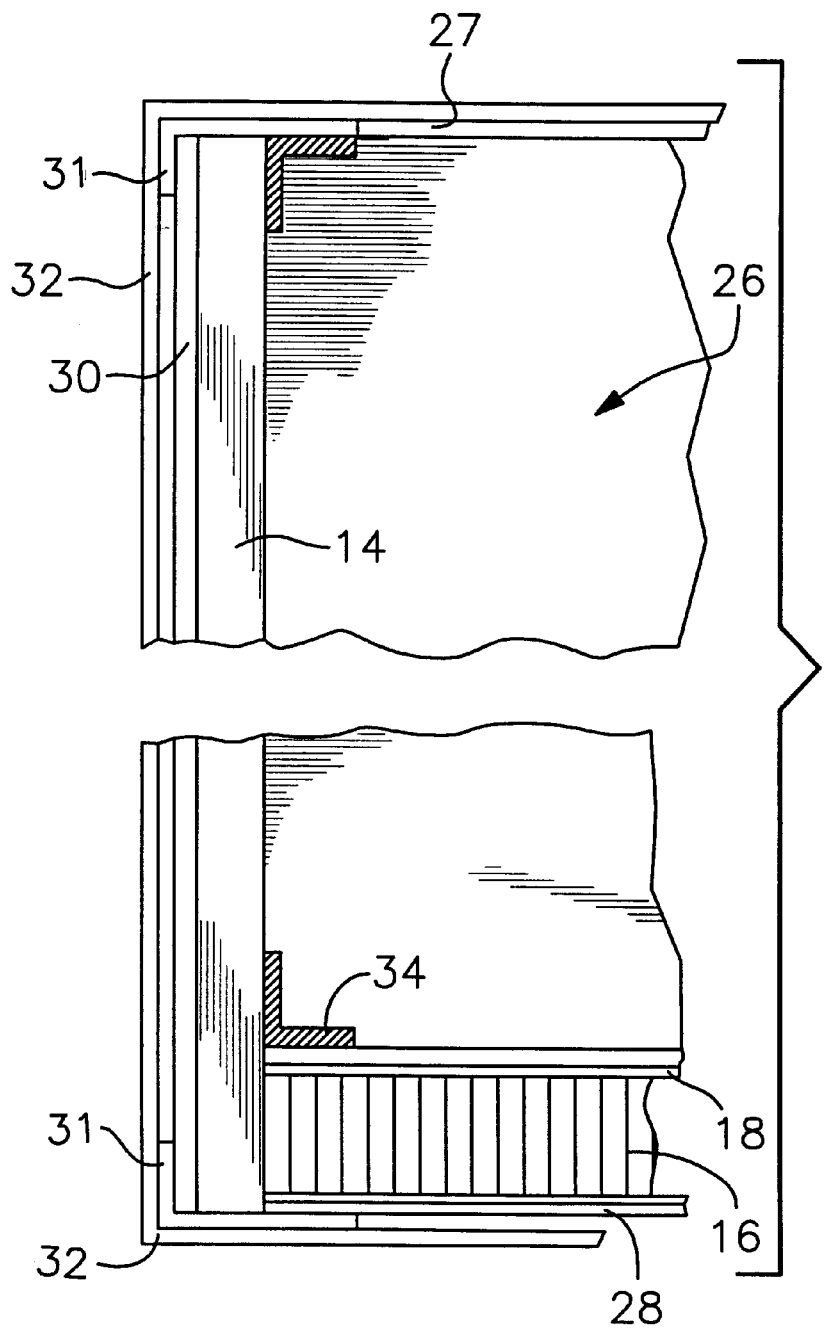
FIG. 5 is an enlarged partial cross-sectional view on lines 5—5 of FIG. 1 with portions broken away.

Referring now to FIGS. 1 and 5 of the drawings, the end cap assemblies 12 are illustrated for respective engagement over a base assembly having a hereinbefore described honeycomb base pad 13 with pairs of oppositely disposed upstanding support tubes 25 that act as spacers and support elements. The end cap assemblies 12 have preformed two-part construction with a closure 26 defining a top flap 27 and a bottom flap 28 and integral sidewall flaps 29 and 30 extending therebetween all of which are in a dimensional configuration to fit over and enclose the hereinbefore described assembled base assemblies 13 illustrated in FIG. 1 of the drawings.

The top and bottom flaps 27 and 28 are notched inwardly from their respective free ends at 27A and 28A so as to effectively be foreshortened. This notching provides a registration space for the respective tube pairs 25 during assembly over the load L. A plurality of independent corner flaps 31 are positioned on the respective corners of the end cap assemblies 12 and extend over the respective ends of the support tubes 25. A retaining sleeve 32 or alternately banding 36 is positioned over the respective closures 26 securing the pre-positioned corner flaps 31 on the closure assembly. To complete the shipping assembly about the load L, pairs of elongated angle edge guards 33 and 34 extend along the entire length of the shipping assembly 10 in its respective interior corners which, in reality, would be on the outer perimeter upper and lower edges of the load L as shown in broken lines in illustration 6 of the drawings.

The elongated angle edge guard pairs 33 and 34 are formed from cellulose material, specifically cardboard and are of a length greater than that of the load L so that the end cap assemblies will be uniform regardless of the load length inconsistency. It will be apparent that the edge guard pairs 33 and 34 are held in place by the overlapping interconnecting element 15 and the top and bottom flanges 27 and 28 of the respective closure assemblies 26.

Figure 3:
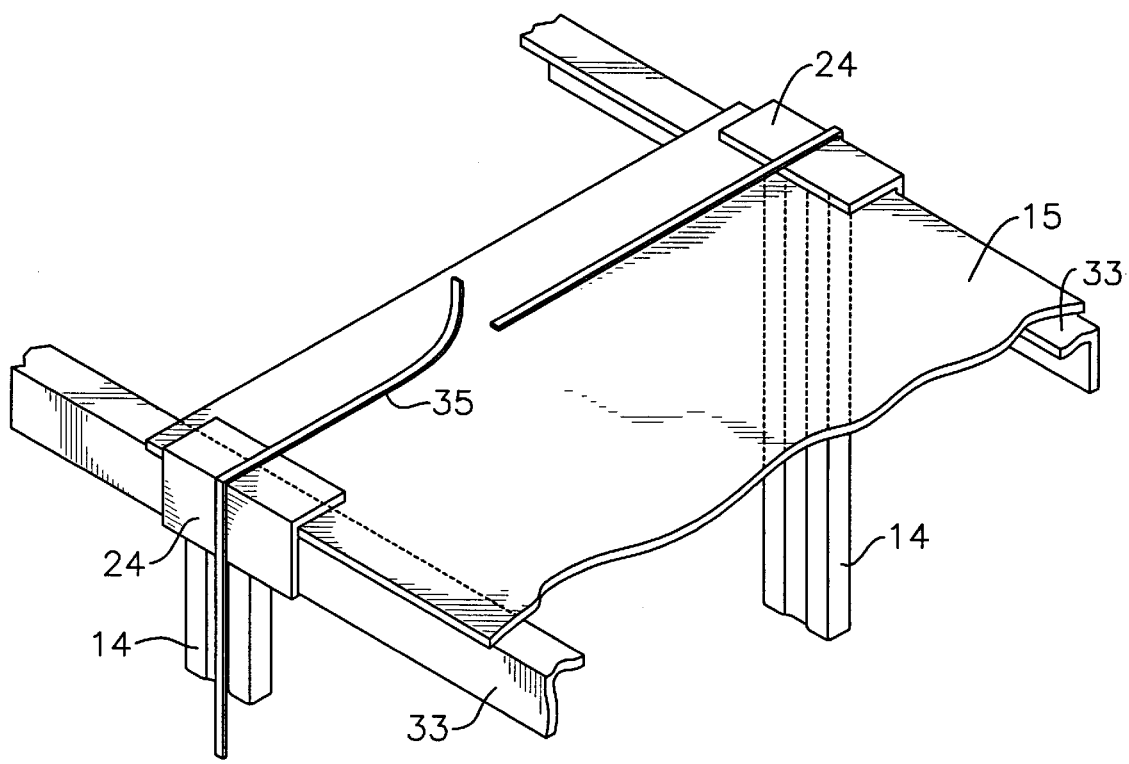
FIG. 3 is an enlarged isometric view of a center top portion of the shipping assembly of the invention with portions broken away.
Figure 4:
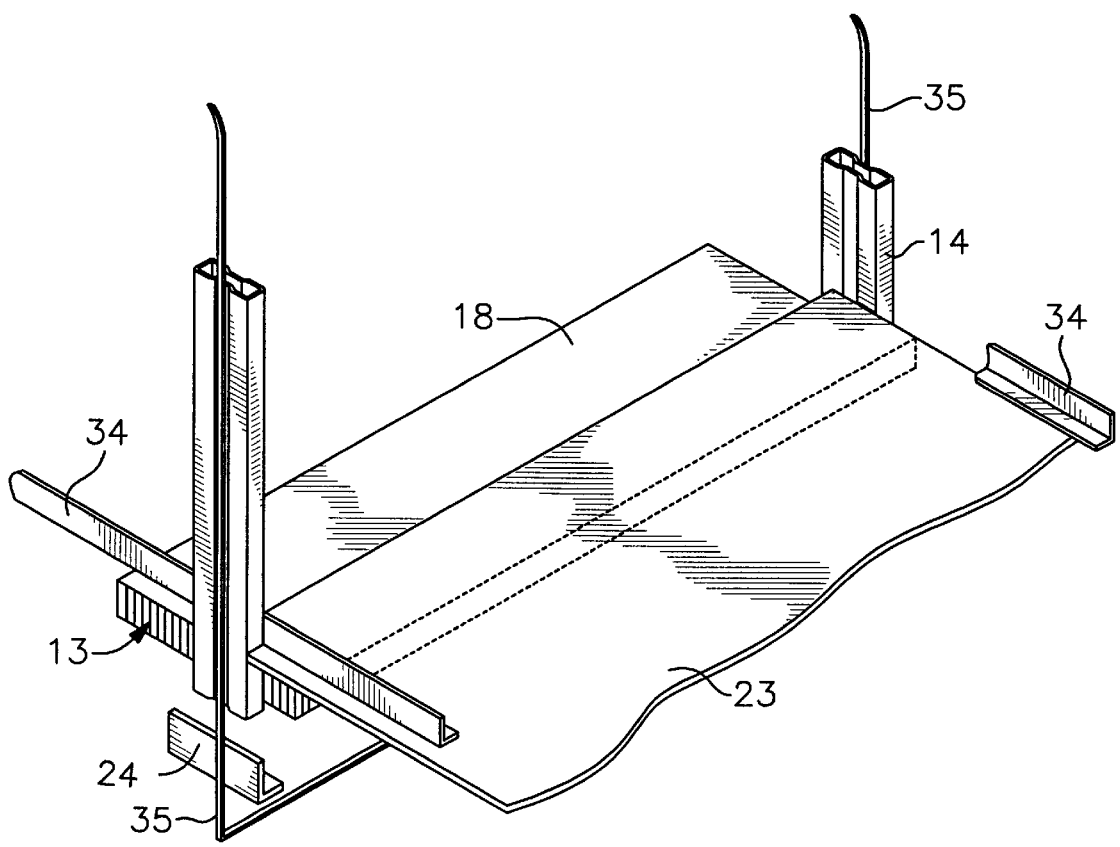
FIG. 4 is an enlarged isometric view of a center bottom portion of the shipping assembly of the invention.

To secure the components of the shipping assembly 10 to the load L banding strips 35 preferably of synthetic resin material are employed around the intermediate support assembly structures 11 specifically over the transversely aligned corner flaps 29 and their respective support tubes 14 as best seen in FIGS. 3 and 4 of the drawings. Additional pairs of banding strips 35A extend longitudinally around the length of the shipping container assembly 10 engaging the respective end cap assemblies 12 as best seen in in FIG. 1 of the drawings as will be well understood by those skilled in the art.

Figure 7:
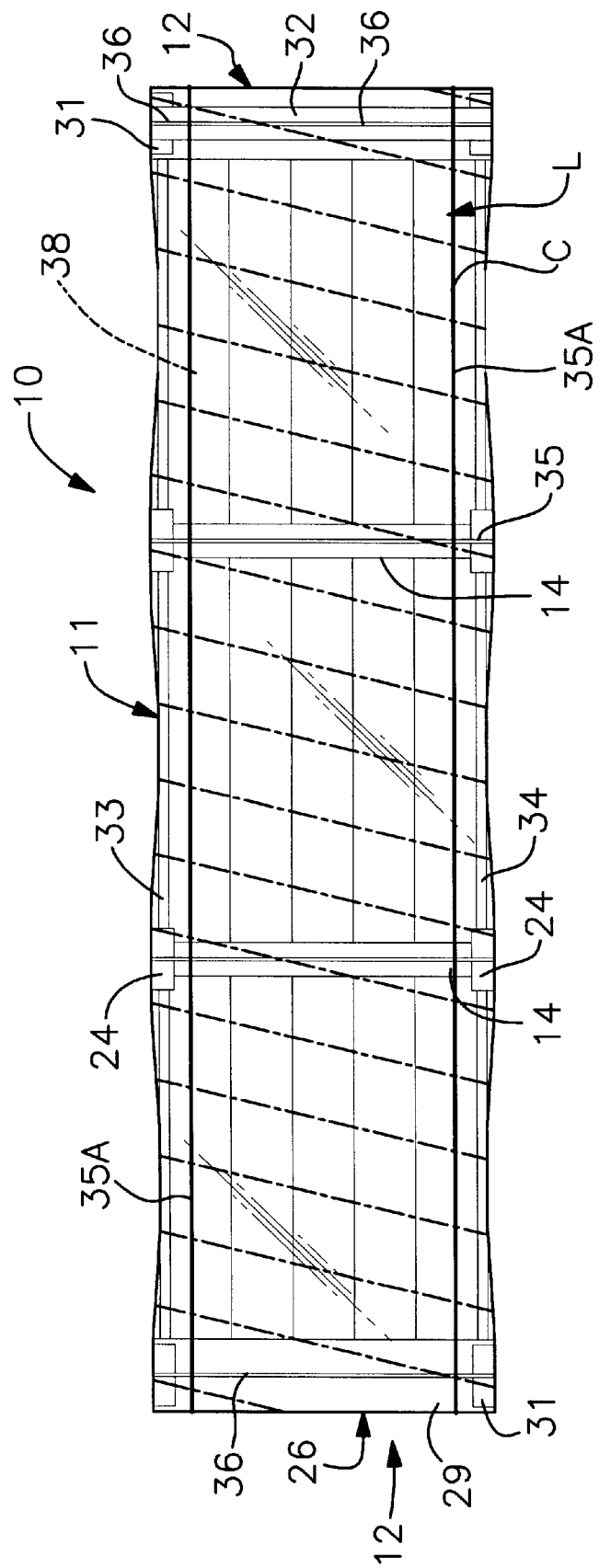
FIG. 7 is a side elevational view of the shipping container system of the invention on a load ready to be shipped.

The entire shipping assembly 10 of the invention is then transversely stretch wrapped in elastic synthetic resin film 38 as best seen in FIG. 7 of the drawings to form a continuous monolithic bundle of material.

The viability of such cellulose construction components of the shipping assembly of the invention will be self-evident in that they can easily be processed and recycled creating a valuable resource for the end receiver. The shipping assembly 10 defines a stabilization system for the load L formed of multiple elongated containers C which have little torsional rigidity and thus requires special securing structures to provide ease of loading and unloading and stability in shipping.

Alternately, it will be apparent to those skilled in the art that substitution can be made for certain elements of the shipping assembly 10 of the invention such as to substitute wood, not shown, in place of the vertical support tubes 14 if so desired without changing the structural integrity of the overall shipping assembly.

It will thus be seen that a new and useful shipping assembly for non-rigid elongated loads has been illustrated and described and it will be apparent to those skilled in the art that various changes and modifications may be made therein without departing from the spirit of the invention.

Therefore I claim:

1. A shipping assembly for shipment of elongated containers of semi-rigid material by securing a plurality of like dimensional containers into an integral bundle, said shipping assembly comprises: a plurality of longitudinally spaced parallel base pads, pairs of upstanding support tubes extending from said base pads, a connecting element interconnecting some of said upstanding support tube pairs in oppositely disposed spaced relation to said base pads, a plurality of corner flaps on the ends of said upstanding support tubes, a base board extending between intermediate ones of said base pads opposite said connecting element, end cap assemblies extending over some of said support tubes and related base pads, means for interengaging said end cap assemblies and said intermediate base pads and upstanding support tube pairs on said bundle of like dimensional containers, and means for securing said shipping assembly about said integral bundle.

2. The shipping assembly set forth in claim 1 wherein said base pads are panels formed of cellulose construction having a honeycomb core between two containment outer sheet surfaces.

3. The shipping assembly set forth in claim 1 wherein said support tubes are of multiple layered cellulose sheet construction.

4. The shipping assembly set forth in claim 1 wherein said connecting element interconnecting some of said support tube pairs to one another comprises: an elongated cardboard sheet having a plurality of positioning notches within.

5. The shipping assembly set forth in claim 4 wherein said positioning notches are engageable on some of said support tube pairs.

6. The shipping assembly set forth in claim 1 wherein said end cap assemblies each comprise an end cap having a top and bottom flap extending therefrom, a pair of spaced parallel sidewall flaps in spaced relation to said respective top and bottom flaps and means for securing said end cap assembly on said load.

7. The shipping assembly set forth in claim 6 wherein said means for securing said end cap assembly on said load comprises a retaining sleeve.

8. The shipping assembly set forth in claim 6 wherein said means for securing said end cap assembly on said load comprises banding about said end caps.

9. The shipping assembly set forth in claim 1 wherein said means for interengaging said respective end cap assemblies and said intermediate base pads and upstanding support tube pairs on the bundle of like dimensional containers comprises: independent elongated angular edge guards between said shipping assembly and said containers.

10. The shipping assembly set forth in claim 1 wherein said means for securing said shipping assembly about said integral bundle of containers comprises: banding about said tube pairs on said intermediate base pads, and a continuous band of stretch wrap film extending transversely about said shipping assembly on said container bundle.

11. The shipping assembly set forth in claim 1 wherein said support tubes extend from and abut free ends of said respective base pads.

12. The shipping assembly set forth in claim 1 wherein said baseboard extending between said base pads opposite said connecting element comprises: a sheet of hard board material having a plurality of notches therein.

13. The shipping assembly set forth in claim 1 wherein said elongated containers of semi-rigid material are positioned transversely across said base pads to form said bundle.

14. The shipping assembly set forth in claim 1 wherein said corner flaps are formed from cardboard material and are of a known dimensional characteristic greater than that of said respective ends of said support tubes.

* * * * *